May 15, 1923.
C. W. DAKE
TURBINE
Filed April 2, 1921
1,455,022
3 Sheets-Sheet 1
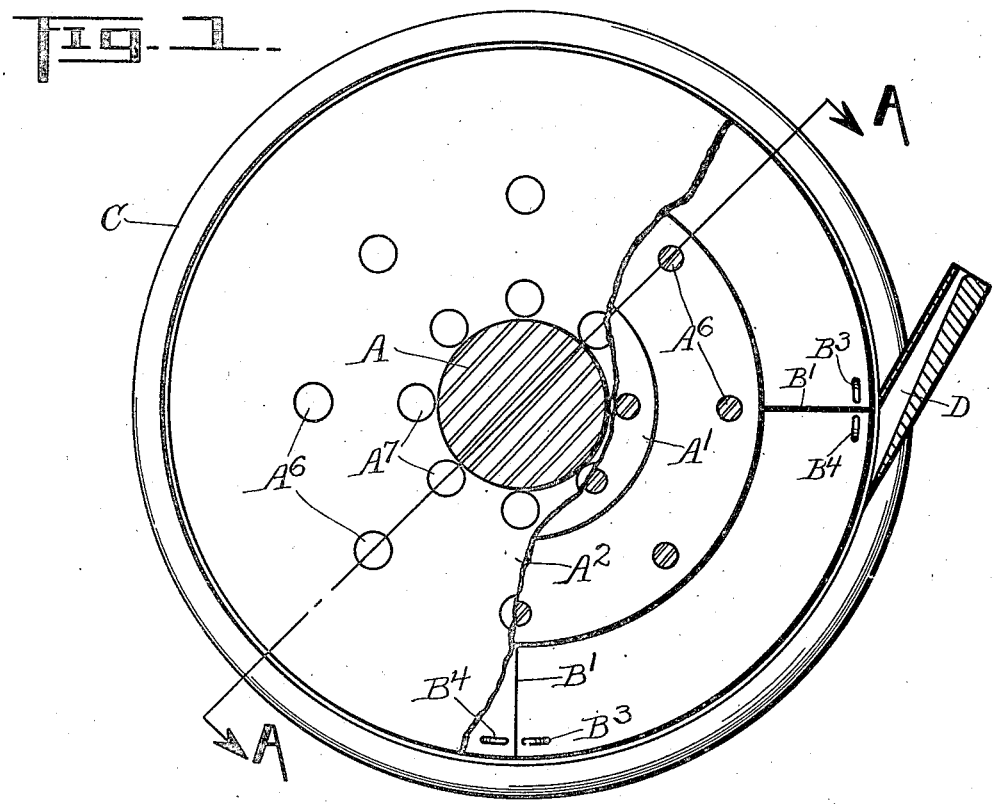
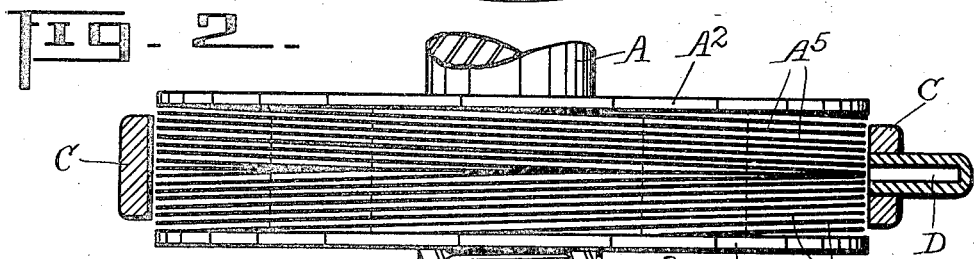
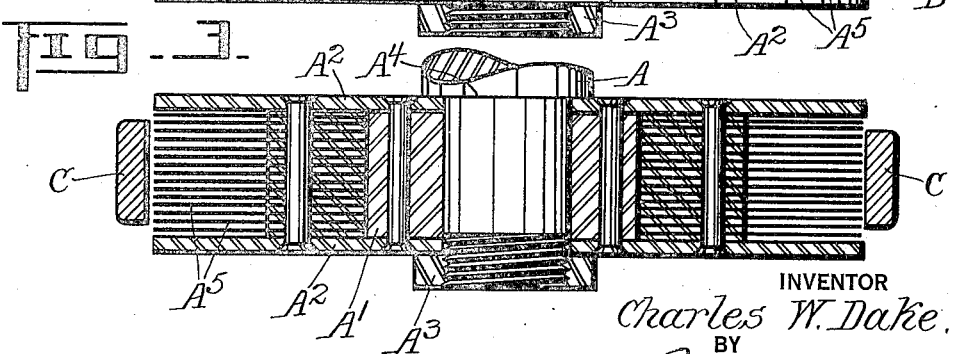
INVENTOR
Charles W. Dake.
BY
Parker & Carter
ATTORNEY May 15, 1923.
C. W. DAKE
1,455,022
TURBINE
Filed April 2, 1921
3 Sheets-Sheet 2
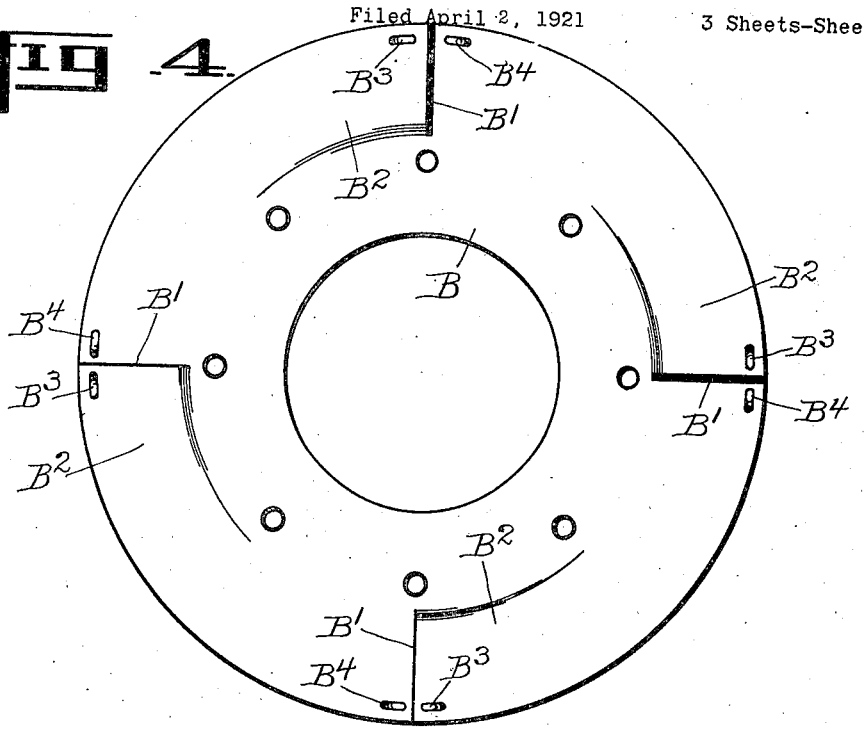
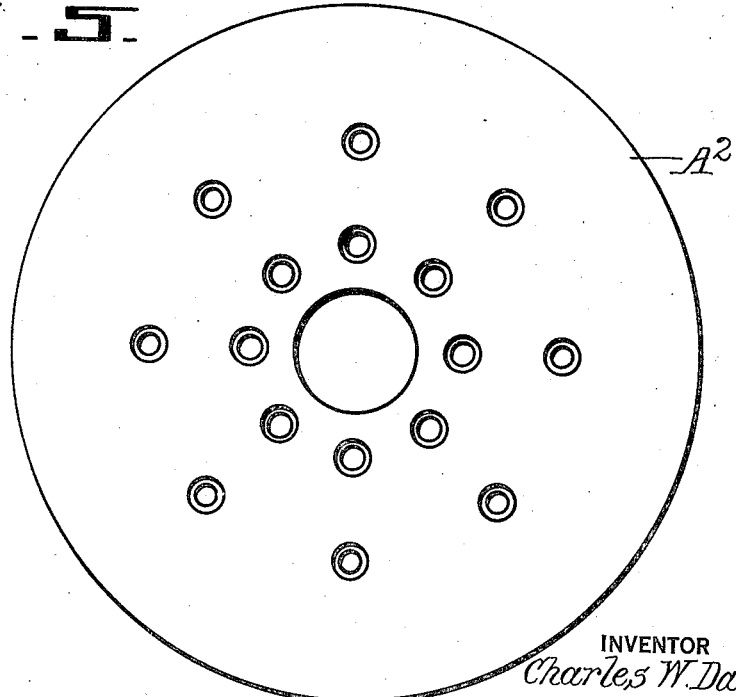
INVENTOR
Charles W. Dake
BY
ATTORNEY

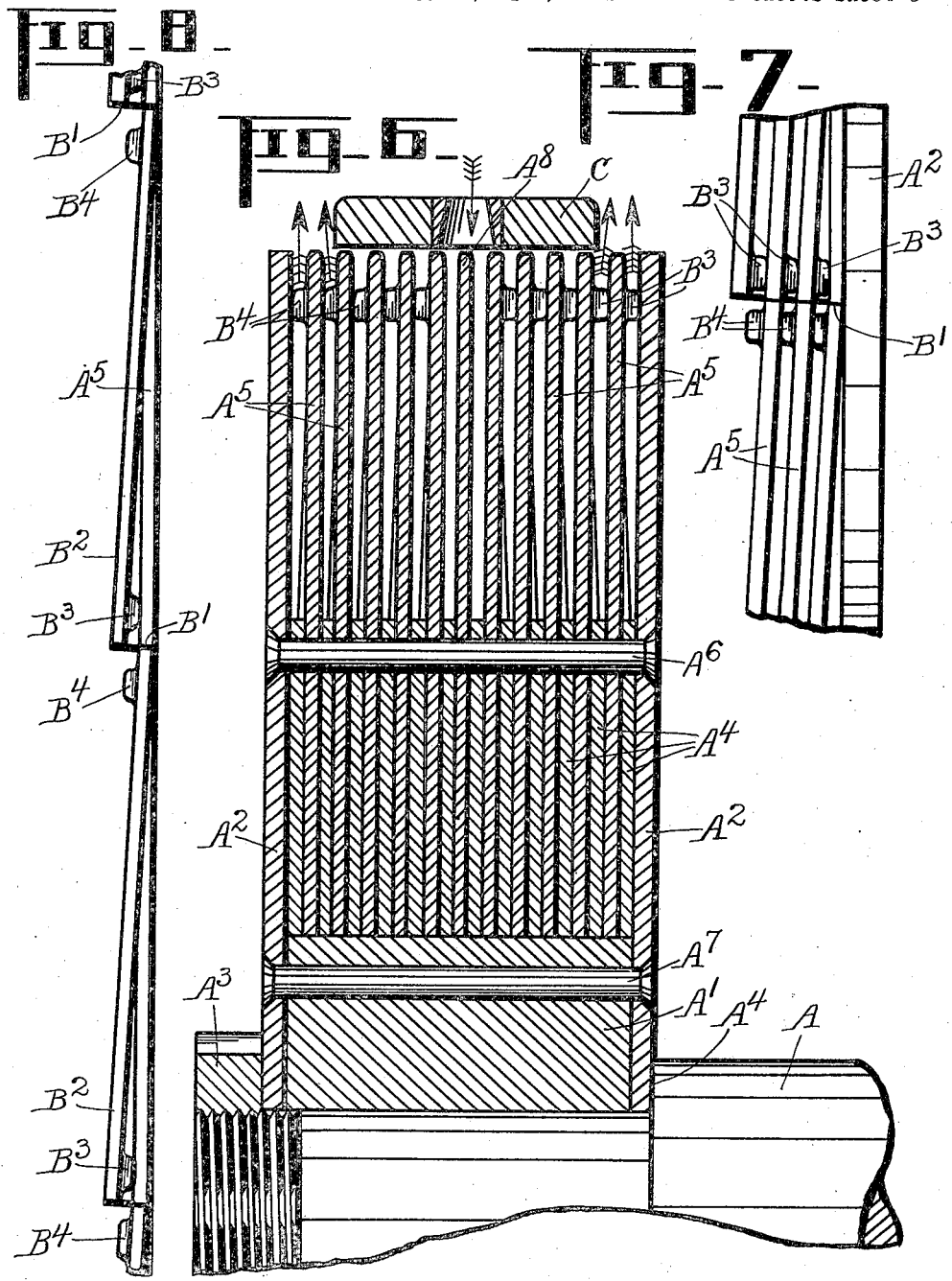

Patented May 15, 1923.

1,455,022

UNITED STATES PATENT OFFICE.

CHARLES W. DAKE, OF CHICAGO, ILLINOIS, ASSIGNOR TO THE PYLE NATIONAL COMPANY, OF CHICAGO, ILLINOIS, A CORPORATION OF NEW JERSEY.

TURBINE.

Application filed April 2, 1921. Serial No. 458,069.

*To all whom it may concern:*

Be it known that I, CHARLES W. DAKE, a citizen of the United States, residing at Chicago, in the county of Cook and State of Illinois, have invented a certain new and useful Improvement in Turbines, of which the following is a specification.

My invention relates to turbines. It has for one object to provide a new and improved form of turbine structure such as may be operated by elastic fluid such as steam or gas and the like, or by hydraulic fluid, water, oil and the like, and the only difference between the hydraulic and elastic fluid turbines embodying my invention would be in matters of detail and dimension, size and shape of the nozzle and rotational speed. I prefer, however, as a general proposition to drive turbines such as mine by means of elastic fluid.

My turbine comprises in general terms, an apparatus whereby the power of the machine is derived by the friction of the fluid against the side walls of long channels in the rotor, that is to say by the adhesion, and viscosity of rapidly moving fluid against these surfaces.

Other types of this class of turbine are illustrated in my copending applications 456,911 and 456,912, filed March 30, 1921.

One object of my invention therefore is to provide such a friction turbine wherein an exceedingly long travel may be given the motive fluid so that there will be ample time for that fluid to give up its speed and be reduced to the same linear speed as the friction surface which it engages before it becomes necessary to discharge the motive fluid from the rotor.

There have been in the past a number of devices wherein frictional engagement of the driving surfaces by the motive fluid was relied upon for the purpose of developing the power and my apparatus differs from them in the arrangements whereby a greatly increased length of path may be travelled, and whereby the speed of the motive fluid may be drawn by frictional resistance down to the speed of the driven parts with a minimum leakage, wastage and loss and thus it is possible by my arrangement for the fluid to give to the motor the maximum percentage of its kinetic energy, and it is also possible by my arrangement to operate turbines at exceedingly low speeds.

The turbines of my type may be operated at exceptionally low speeds, and the rotor is so constructed as to absorb all of the velocity from a highly efficient nozzle, or, in other words, one which converts the pressure of the steam into velocity and increases that velocity to the maximum within the expansion of the steam from the highest pressure which it may be possible to generate.

In my present invention I arrange the rotor travelling within a housing in such fashion that the steam of working fluid passes round and round the axis of the rotor through a spiral passage making a large number of complete revolutions while travelling longitudinally along the shaft until the motive fluid is discharged peripherally from a point longitudinally removed from the nozzle.

The invention is illustrated more or less diagrammatically in the accompanying drawings wherein:

Fig. 1 is an end elevation with parts in section and parts removed;

Fig. 2 is a side elevation in part section through the housing and nozzle;

Fig. 3 is a part section in part elevation through the rotor;

Fig. 4 is a plan view of one of the rotor elements;

Fig. 5 is a plan view of one of the rotor end plates;

Fig. 6 is a section on an enlarged scale through the rotor.

Fig. 7 is a detail plan view on an enlarged scale showing the relation of adjacent rotor discs;

Fig. 8 is a similar view on reduced scale of Fig. 7;

Like parts are indicated by like characters in all the drawings.

A is a rotor shaft mounted for rotation in bearings not here shown. A' is a hub keyed to the shaft. $A^2$ $A^2$ are end plates mounted on the shaft and adapted to be clamped in position between the nut $A^3$ screw threaded on the shaft, and the shoulder $A^4$, the arrangement being such that the hub provides a spacer between the two end plates. Mounted on this hub and positioned between the end plates are a series of alternate annular spacing discs $A^4$ $A^4$ and driving discs $A^5$ $A^5$, the spacing discs being of much less outer diameter than the driving discs.

Rivets or pins A⁶ A⁷ hold the end plates and the spacing and driving discs together. A⁸ is a partition or distributing disc at the center of the rotor interposed between two separate groups of spacing and driving discs.

B in Fig. 4 is one of the driving discs. It will be noted that this disc is radially cut or slotted from its periphery inwardly as shown at B′ B′. In this case there are four such cuts. There might be more or there might be less. The cut periphery of the disc is bent to one side as indicated at B² B². B³ B⁴ are spacing lugs arranged in adjacent pairs immediately adjacent the cuts, one being on one side of the plate, the other on the other.

These cut and bent portions of the driving plates or discs are arranged in what I have called windmill fashion and they are assembled as shown in Fig. 6 so that the aligning lugs or projections B³ B⁴ space the separate discs apart and hold them in proper position and from Fig. 8 it will be noted that these windmill shaped portions are so arranged that the forward edge of one section or cut comes into line with the rearward edge of the section or cut not in the same disc but in the next one so that as shown in Fig. 2 these offset or windmill shaped elements form two or more generally spiral passages extending round and round the periphery and the arrangement is such that these passages spiral in opposite directions.

C is a circular shroud surrounding the periphery of the rotor but terminating just short of the rotor so that the outer extremities of the screw threaded passages are not closed by the shroud but the inner portions are. D is a steam expansion nozzle discharging radially inwardly through the shroud against the central portion of the rotor, the arrangement being such that the dividing or distributing plate A⁸ comes in the center of the nozzle and tends to divide the motive fluid rate into two separate branches, one spirally out to the right, the other to the left.

When the steam is turned on through the nozzle it rushes into the low tangential space between the discs at high velocity. This steam or other liquid or fluid is distributed into two branches as suggested and passes round and round the rotor along the spiral passage or path. As it rushes on through this narrow spiral path it will be in frictional contact with the walls on both sides of the passage and will gradually by friction and viscosity give up its kinetic energy and tend to decrease in velocity with accompanying increase in velocity of the rotor. This jet or current of motive fluid cannot escape owing to the presence of the shroud until it is passed beyond the end of the shroud, by which time it will have given up practically all of its kinetic energy and will be discharged from the rotor.

There is, of course, a slight amount of clearance between the shroud and the edges of the driving disc, but this clearance is very slight and any leakage across the discs will be limited by the pressure or velocity drop between the parts of the spiral passage separated by any such disc and while there will be some leakage all the way along the line, the leakage will be very slight and leakage from one passage will be made up by leakage into the next passage, in each case of the first spiral or coil of the passage.

Although I have here illustrated an operative device, many changes in size, shape and distribution of parts may be made without changing the spirit of my invention.

I claim—

1. In a steam turbine rotor, a shaft, a plurality of annular plates mounted thereon, said plates being radially cut adjacent their periphery and bent between the cuts in planes inclined to the axis of rotation and to the plates themselves, to form a continuous substantially spiral steam passage, and spacing lugs on said plates adapted to hold the flat and the inclined portions in position.

2. In a steam turbine rotor, a shaft, a plurality of annular plates mounted thereon, said plates being radially cut adjacent their periphery and bent between the cuts in planes inclined to the axis of rotation and to the plates themselves, to form a continuous substantially spiral steam passage, the cut edges of one of said plates being in line with the opposed cut edges of the adjacent plates, and spacing lugs on said plates adapted to hold the flat and the inclined portions in position.

3. A steam turbine rotor comprising a shaft, a plurality of annular plates mounted thereon, a housing thereabout, a steam inlet adapted to deliver steam to said plates intermediate the ends of the rotor, the plates at either side of said inlet being radially cut and bent in two planes oppositely inclined to the axis of rotation, to form continuous substantially spiral paths from the steam inlet to the ends of the rotor, and a continuous dividing plate opposite the steam inlet.

4. In a steam turbine rotor, a shaft, a plurality of annular plates mounted thereon, said plates being radially cut adjacent their periphery and bent between the cuts in planes inclined to the axis of rotation and to the plates themselves, to form a continuous steam passage, an end plate for each end of the rotor, adapted to prevent the escape of steam longitudinally from the rotor, a shroud surrounding the rotor, there being only a working clearance between the interior of said shroud and the periphery of the rotor discs, the rotor extending slightly beyond the shroud at each end thereof.

5. In a steam turbine rotor, a shaft, a plurality of annular plates mounted thereon, said plates being radially cut adjacent their periphery and bent between the cuts in planes inclined to the axis of rotation and to the plates themselves, to form a continuous steam passage, an end plate for each end of the rotor, adapted to prevent the escape of steam longitudinally from the rotor, a shroud surrounding the rotor, there being only a working clearance between the interior of said shroud and the periphery of the rotor discs, the rotor extending slightly beyond the shroud at each end thereof, the shroud being provided with a steam nozzle adjacent its center, and a plane steam distributing disc in the center of said rotor in line with said nozzle, the bent portions of the discs at either side thereof being inclined in opposite direction.

6. In a steam turbine, a rotor shaft, a rotor comprising a plurality of annular plates mounted thereon, said plates being perforated to form a continuous steam passage along said rotor, an end plate for each end of the rotor adapted to prevent the escape of steam longitudinally from the rotor, a shroud surrounding the rotor, there being only a working clearance between the interior of said shroud and the periphery of the rotor discs, the rotor extending slightly beyond the shroud at each end thereof.

7. In a steam turbine, a rotor shaft, a rotor comprising a plurality of annular plates mounted thereon said plates being perforated to form a continuous steam passage along said rotor, an end plate for each end of the rotor adapted to prevent the escape of steam longitudinally from the rotor, a shroud surrounding the rotor, there being only a working clearance between the interior of said shroud and the periphery of the rotor discs, the rotor extending slightly beyond the shroud at each end thereof, the shroud being provided with a steam nozzle adjacent its center and a steam distributing disc in the center of said rotor in line with said shroud, the plates on opposite sides of said distributing disc being adapted to discharge the steam delivered thereto toward the opposite ends of the rotor and about the opposite ends of the shroud.

Signed at Chicago, county of Cook and State of Illinois, this 21st day of March, 1921.

CHARLES W. DAKE.